(12) United States Patent
Schroeder et al.

(10) Patent No.: US 11,279,311 B2
(45) Date of Patent: Mar. 22, 2022

(54) ROOF-MOUNTED OCCUPANT RESTRAINT SYSTEM

(71) Applicant: ZF Passive Safety Systems US Inc., Washington, MI (US)

(72) Inventors: Alexandra E. Schroeder, Lenox, MI (US); Kurt F. Fischer, Rochester, MI (US)

(73) Assignee: ZF PASSIVE SAFETY SYSTEMS US INC., Washington, MI (US)

( * ) Notice: Subject to any disclaimer, the term of this patent is extended or adjusted under 35 U.S.C. 154(b) by 0 days.

(21) Appl. No.: 16/971,315

(22) PCT Filed: Dec. 3, 2018

(86) PCT No.: PCT/US2018/063537
§ 371 (c)(1),
(2) Date: Aug. 20, 2020

(87) PCT Pub. No.: WO2019/168577
PCT Pub. Date: Sep. 6, 2019

(65) Prior Publication Data
US 2020/0391688 A1   Dec. 17, 2020

Related U.S. Application Data

(60) Provisional application No. 62/666,771, filed on May 4, 2018, provisional application No. 62/661,667, filed
(Continued)

(51) Int. Cl.
*B60R 21/214*   (2011.01)
*B60R 21/233*   (2006.01)
(Continued)

(52) U.S. Cl.
CPC .......... *B60R 21/214* (2013.01); *B60R 21/233* (2013.01); *B60R 21/239* (2013.01);
(Continued)

(58) Field of Classification Search
CPC . B60R 21/214; B60R 21/233; B60R 21/2338; B60R 21/26; B60R 21/232;
(Continued)

(56) References Cited

U.S. PATENT DOCUMENTS 3,774,936 A * 11/1973 Barnett .................. B60R 21/214
280/730.1
5,366,241 A    11/1994 Kithil
(Continued)

FOREIGN PATENT DOCUMENTS

GB          2345669          7/2000

*Primary Examiner* — Keith J Frisby
(74) *Attorney, Agent, or Firm* — Tarolli, Sundheim, Covell & Tummino LLP (57) ABSTRACT

A restraint system for helping to protect an occupant (60) of a vehicle (20) includes a first inflator (74) for providing inflation fluid at a first fluid pressure and a second inflator (76) for providing inflation fluid at a second fluid pressure greater than the first fluid pressure. An airbag (70) includes a stored condition within a roof (32) and is inflatable to a deployed condition extending into a cabin (40) and aligned with a seat (50) for the occupant (60). The airbag (70) includes a first portion (98) defining a first chamber (100) fluidly connected to the first inflator (74) and a second portion (102) defining a second chamber (104) fluidly connected to the second inflator (76) and fluidly isolated from the first chamber (100). The first portion (98) moves relative to the second portion (102) in response to occupant (60) penetration into the airbag (70).

20 Claims, 8 Drawing Sheets

Related U.S. Application Data on Apr. 24, 2018, provisional application No. 62/636,899, filed on Mar. 1, 2018.

(51) Int. Cl.

| | |
|---|---|
| *B60R 21/2338* | (2011.01) |
| *B60R 21/26* | (2011.01) |
| *B60R 21/232* | (2011.01) |
| *B60R 21/239* | (2006.01) |
| *B60R 21/237* | (2006.01) |
| *B60R 21/231* | (2011.01) |
| *B60R 21/2342* | (2011.01) |
| *B60R 21/00* | (2006.01) |

(52) U.S. Cl.
CPC .......... *B60R 21/2338* (2013.01); *B60R 21/26* (2013.01); *B60R 21/232* (2013.01); *B60R 21/237* (2013.01); *B60R 21/2342* (2013.01); *B60R 2021/0004* (2013.01); *B60R 2021/23153* (2013.01); *B60R 2021/23192* (2013.01); *B60R 2021/23308* (2013.01); *B60R 2021/23316* (2013.01); *B60R 2021/23324* (2013.01); *B60R 2021/23386* (2013.01); *B60R 2021/26058* (2013.01)

(58) Field of Classification Search
CPC ................ B60R 21/231; B60R 21/213; B60R 2021/23192; B60R 2021/23153; B60R 2021/23324; B60R 2021/23386; B60R 2021/23161; B60R 2021/0004; B60R 2021/23308; B60R 2021/23316; B60R 2021/23332; B60R 2021/0048; B60R 2021/26058
USPC ................... 280/729, 730.1, 743.2
See application file for complete search history.

(56) References Cited

U.S. PATENT DOCUMENTS

| | | |
|---|---|---|
| 6,435,553 B1 | 8/2002 | Wipasuramonton et al. |
| 6,722,691 B1 * | 4/2004 | Håland et al. ........ B60R 21/214 280/730.1 |
| 6,966,579 B2 * | 11/2005 | Schneider ........... B60R 21/2338 280/728.2 |
| 9,676,361 B2 * | 6/2017 | Smith ................... B60R 21/214 |
| 2002/0166710 A1 | 11/2002 | Breed |

* cited by examiner

ROOF-MOUNTED OCCUPANT RESTRAINT SYSTEM

CROSS REFERENCE TO RELATED APPLICATIONS

This application is a national stage of International Application No. PCT/US2018/063537, filed Dec. 3, 2018, which claims benefit of U.S. Provisional Appln. Nos. 62/636,899, filed Mar. 1, 2018, 62/661,667, filed Apr. 24, 2018, and 62/666,771, filed May 4, 2018. The disclosures of these applications are incorporated herein by reference in their entireties.

RELATED APPLICATIONS

This application claims the benefit of U.S. Provisional Appln. Nos. 62/666,771, filed May 4, 2018; 62/661,667, filed Apr. 24, 2018; and 62/636,899, filed Mar. 1, 2018, the entirety of which are incorporated by reference herein.

TECHNICAL FIELD

The present invention relates generally to vehicle airbags and, in particular, relates to a roof-mounted airbag having multiple chambers.

BACKGROUND

It is known to provide an inflatable vehicle occupant protection device, such as an airbag, for helping to protect an occupant of a vehicle. One particular type of airbag is a frontal airbag inflatable between an occupant of a front seat of the vehicle and an instrument panel of the vehicle. Such airbags may be driver airbags or passenger airbags. When inflated, the driver and passenger airbags help protect the occupant from impacts with parts of the vehicle such as the instrument panel and/or a steering wheel of the vehicle.

Passenger airbags are typically stored in a deflated condition in a module that is mounted to the vehicle instrument panel. An airbag door is connectable with the module and/or instrument panel to help enclose and conceal the airbag in a stored condition. Upon deployment of the passenger airbag, the airbag door opens to permit the airbag to move to an inflated condition. The airbag door opens as a result of forces exerted on the door by the inflating airbag.

Driver airbags are typically stored in a deflated condition in a module that is mounted on the vehicle steering wheel. An airbag cover is connectable with the module and/or steering wheel to help enclose and conceal the airbag in a stored condition. Upon deployment of the driver airbag, the airbag cover opens to permit the airbag to move to an inflated condition. The airbag cover opens as a result of forces exerted on the cover by the inflating driver airbag.

There are trends in the auto industry to make vehicles more spacious. Styling has been making the instrument panel smaller and thus farther away from the occupant. Looking further into the future, driverless, autonomous vehicles are even more spacious. Autonomous vehicles have been contemplated for some time, and now their adaption on a large scale is approaching. Autonomous vehicles can eliminate some of the structure.

With these realities as a backdrop, the paradigm of occupant safety systems must shift. In the past, the necessity of a vehicle operator/driver lent to a somewhat standard vehicle passenger cabin configuration. In the U.S., the driver is a front seat, left side, forward facing occupant within reach of the vehicle controls and instrumentation (steering wheel, pedals, instrument panel, console, etc.). This driver configuration helps dictate the layout of the remainder of the vehicle—front seat, forward-facing passenger-side occupant, rear seat (second row, third row, etc.) forward-facing occupants. Accordingly, in the past, occupant safety systems were typically designed with this passenger cabin layout and the associated occupant positions and orientations in mind.

The autonomous vehicle eliminates the operator/driver, which eliminates the necessity of their being positioned and oriented in the conventional manner. Vehicle manufacturers are free to utilize passenger cabin space as they see fit without being constrained to predetermined passenger arrangements, such as all forward-facing occupants, or vehicle structural configurations, such as steering wheel/instrument panel configurations, center console configurations, foot well pedal controls, etc.

This presents the challenge of not only where to locate airbag systems, but also finding a reaction surface against which to position the airbag so that it can absorb impacts. Typically, instrument panel and steering wheel mounted frontal airbags utilize those structures as a reaction surface against which the airbag rests so that it can oppose, cushion, and absorb the impact energy of an impacting occupant and provide a desired ride-down effect. In the autonomous vehicles, however, the vehicle may not have an instrument panel or steering wheel at all, and the occupants can be positioned and oriented outside the traditional manner. This can make it difficult or impossible to utilize traditional structures in the vehicle as reaction surfaces.

SUMMARY

In one example, a restraint system for helping to protect an occupant of a vehicle having a roof and a cabin with a seat for the occupant includes a first inflator for providing inflation fluid at a first fluid pressure and a second inflator for providing inflation fluid at a second fluid pressure greater than the first fluid pressure. An airbag includes a stored condition within the roof and is inflatable to a deployed condition extending into the cabin and aligned with the seat. The airbag includes a first portion defining a first chamber fluidly connected to the first inflator and a second portion defining a second chamber fluidly connected to the second inflator and fluidly isolated from the first chamber. The first portion moves relative to the second portion in response to occupant penetration into the first portion.

In another example, a restraint system for helping to protect an occupant of a vehicle having a roof and a cabin with a seat for the occupant includes a first inflator for providing inflation fluid at a first fluid pressure. A second inflator provides inflation fluid at a second fluid pressure greater than the first fluid pressure. An airbag has a stored condition within the roof and is inflatable to a deployed condition extending into the cabin and aligned with the seat. The airbag includes panels interconnected by a seam to form a first portion defining a first chamber and a second portion defining a second chamber and fluidly isolated from the first chamber. The second portion extends around the entire perimeter of the first portion. The first and second chambers are fluidly connected to the respective first and second inflators. The first portion moves relative to the second portion in response to occupant penetration into the first portion.

Other objects and advantages and a fuller understanding of the invention will be had from the following detailed description and the accompanying drawings.

DETAILED DESCRIPTION

Figure 1:
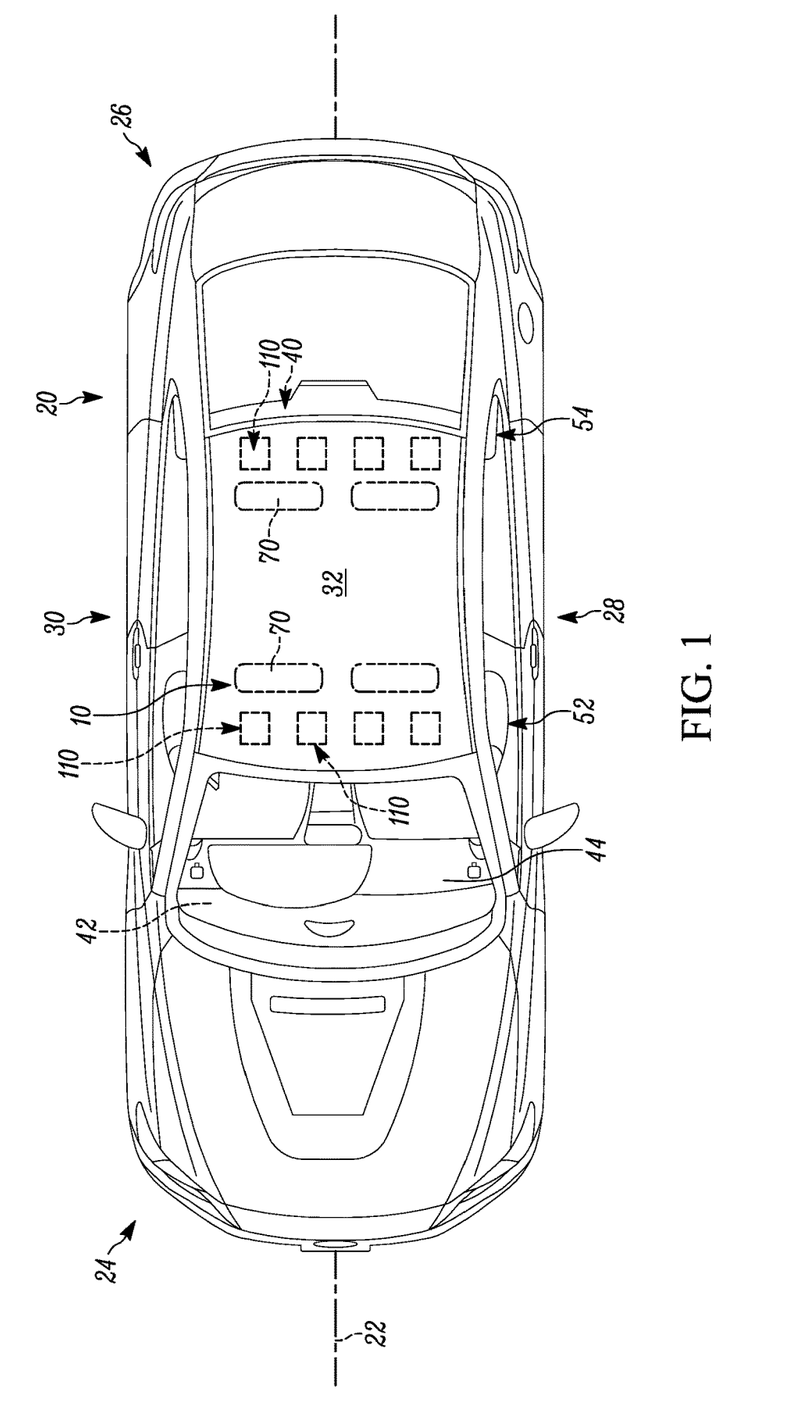
FIG. 1 is a top view of a vehicle including an example roof-mounted, occupant restraint system.
Figure 2:
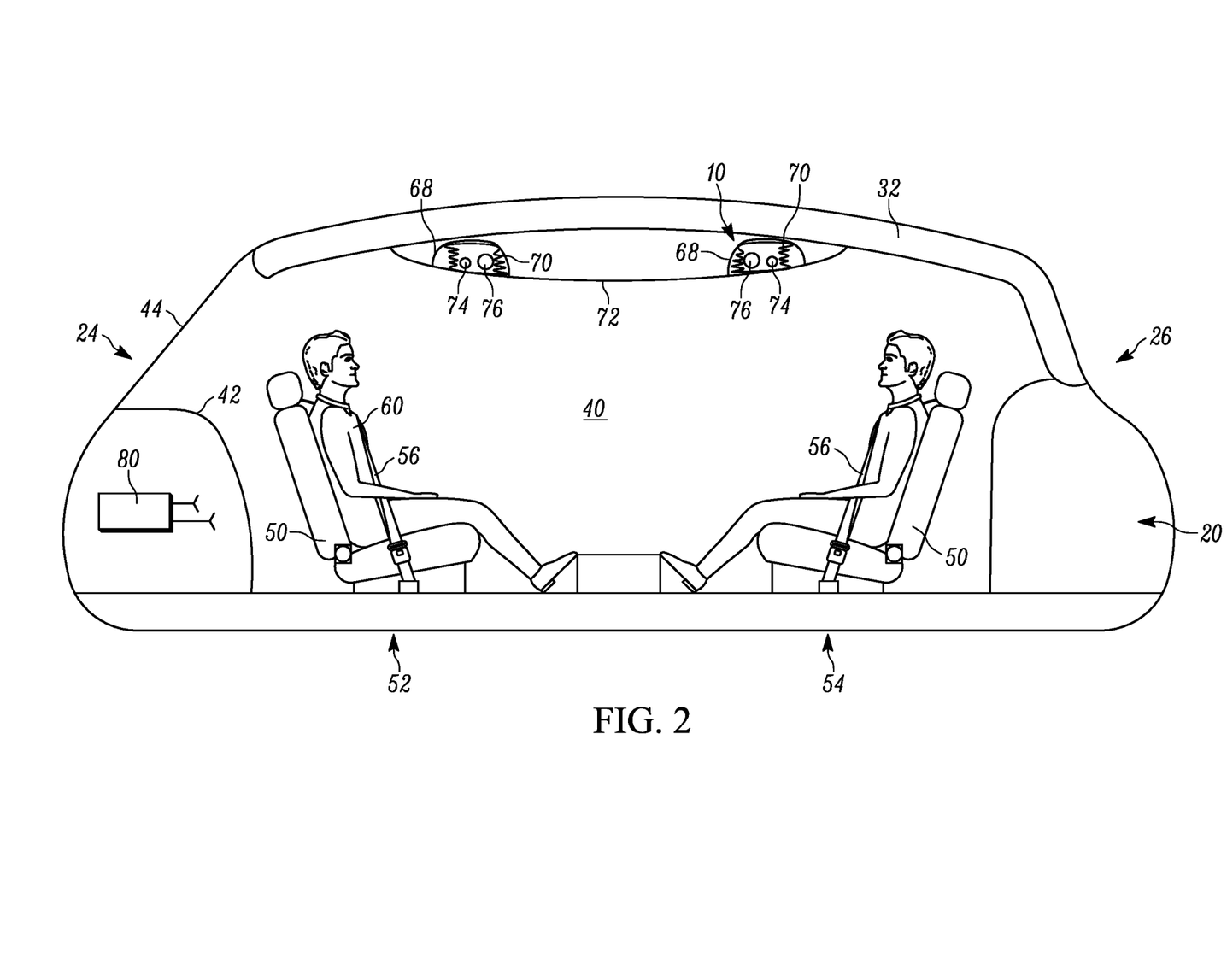
FIG. 2 is a schematic illustration of a cabin of the vehicle with an airbag of the occupant restraint system in a stored condition.

The present invention relates generally to vehicle airbags and, in particular, relates to a roof-mounted airbag having multiple chambers. FIGS. 1-2 illustrate an example vehicle safety system in the form of an occupant restraint system 10. The vehicle 20 extends along a centerline 22 from a first or fore end 24 to a second or aft end 26. The vehicle 20 extends to a left side 28 and a right side 30 on opposite sides of the centerline 22. The first end 24 of the vehicle 20 includes an instrument panel 42 facing a passenger compartment or cabin 40. A windshield or windscreen 44 can be located between the instrument panel 42 and the roof 32.

The vehicle 20 can be an autonomous vehicle, in which case the cabin 40 can be without operator controls, such as a steering wheel, pedals, instrumentation, center console, etc. Accordingly, the instrument panel 42 can be reduced in size or removed altogether in order to maximize the space in the cabin 40.

Seats 50 are positioned in the cabin 40. In this open passenger cabin 40 configuration, the vehicle seats 50 can be configured, positioned, and arranged in a variety of manners, not constrained by the need to facilitate a vehicle driver/operator. For example, in FIG. 2, the seats 50 can be arranged in front and rear rows 52 and 54, respectively, facing each other, with the front row facing rearward toward the rear row. Alternatively, the front and rear rows 52 and 54 can both be arranged in a forward-facing manner (not shown), similar to that of conventional automobiles. In either case, each seat 50 is fitted with a seatbelt 56 for restraining its occupant 60. Control interfaces for climate controls, GPS, navigation, entertainment, etc. can, for example, be provided in a center console area of the vehicle 20 located between the occupants 60 of the front and/or rear rows 52, 54.

For the unconventional, forward-rearward seating arrangement of FIG. 2, in the event of a frontal crash, the occupants 60 of the forward-facing rear row 54 are restrained by their respective seatbelts 56. Occupants 60 of the rear-facing front row 52, while buckled, are supported in a frontal crash by the seatbacks of the vehicle seats 50. Because of this, the seats 50 must be constructed to support the occupants 60 in the event of a crash. For the forward-facing occupants 60 in the rear row 54, the seatbelts 56 offer some degree of restraint. It is desirable, however, for both rows 52, 54 to include additional restraints for head and neck support.

Since the front row 52 need not face forward and need not be in close proximity to the instrument panel 42 or the area where an instrument panel would normally reside, there can be a large volume of space between the front row 52 and the forward cabin structure presented facing the front row. Because of this, it may not be efficient to deploy airbags from this location due to the large volume that the airbags would need to occupy. This would present problems in sizing the airbag(s) and inflator(s) to occupy that large volume, and could also present problems in deploying the airbag(s) into that large volume in the necessary short time required to protect the occupants in a crash scenario.

It is therefore evident that the various passenger seating configurations enabled by autonomous vehicles can present challenges to the conventional concepts of airbag protection. Furthermore, since airbags require structure supporting the deployed airbag against movement in response to occupant penetration (e.g., a reaction surface), the absence of typical vehicle architecture that acts as a reaction surface, such as an instrument panel, presents additional challenges.

With this in mind, the occupant restraint system 10 shown in FIGS. 1-2 includes at least one airbag module 68 for placement along the roof 32 of the vehicle 20. Each airbag module 68 includes at least one vehicle occupant protection device in the form of an inflatable curtain airbag 70 and inflators 74, 76 for providing inflation fluid to the airbag. Mounting the airbag module 68 in the vehicle roof 32 is convenient because the airbags 70 can be positioned in a location with a desired proximity to the occupants 60 they are intended to help protect. This can help reduce the necessary inflatable volume of the airbags 70 and can also help provide a desired airbag deployment time without requiring an excessively high-volume inflator.

The airbag modules 68 are housed/concealed in the roof structure of the vehicle 20 behind, for example, a roof liner 72. The airbag 70 is at least one of rolled and folded within the airbag module 68 before being placed behind the roof liner 72. The inflators 74, 76 are operatively connected (e.g., by wires) to an airbag controller 80 (see FIG. 2) that includes or communicates with one or more crash sensors (not shown). The controller 80 is operative to determine the occurrence of a crash event and to actuate the inflators 74, 76 in a known manner to inflate the airbag 70. The inflators 74, 76 can be of any known type, such as stored gas, solid propellant, augmented or hybrid. Regardless, the inflator 74 supplies inflation fluid to the airbag 70 at a first fluid pressure. The inflator 76 supplies inflation fluid to the airbag 70 at a second fluid pressure greater than the first fluid pressure.

The airbag 70 can be constructed of any suitable material, such as nylon (e.g., woven nylon 6-6 yarns), and may be constructed in any suitable manner. For example, the airbag 70 may include one or more pieces or panels of material. If more than one piece or panel is used, the pieces or panels can be interconnected by known means, such as stitching, ultrasonic welding, heat bonding, or adhesives, to form the airbag 70. The airbag 70 can be uncoated, coated with a material, such as a gas impermeable urethane, or laminated with a material, such as a gas impermeable film. The airbag 70 can therefore have a gas-tight or substantially gas-tight construction. Those skilled in the art will appreciate that alternative materials, such as polyester yarn, and alternatives coatings, such as silicone, may also be used to construct the airbag 70.

The occupant restraint system 10 can include multiple airbag modules 68 provided along the roof 32 and within the roof liner 72 at locations associated and aligned with each seat 50 in each row 52, 54. In other words, each seat 50 in the vehicle 20 can have an individual airbag module 68 and, thus, each seat can have an individual airbag 70 associated and aligned therewith. In each case, the airbag 70 is positioned in front of the associated seat 50 in each row 52, 54 in the direction the occupants 60 in those seats would face (i.e., rearward of the front row 52 and forward of the rear row 54).

The airbags 70 extend in the left-to-right direction of the vehicle 20 generally parallel to the width of the seats 50. Alternatively, a single airbag 70 can span the entire width of the cabin 40 to protect all the occupants 60 in an entire row 52 or 54 (not shown). In the example shown in FIG. 2, airbags 70 are provided behind the roof liner 72 and associated with a seat 50 in each row 52, 54. The airbag modules 68 are identical and, thus, the construction and operation of only the airbag module associated with the seat 50 in the rear row 54 is discussed for brevity.

Figure 3:
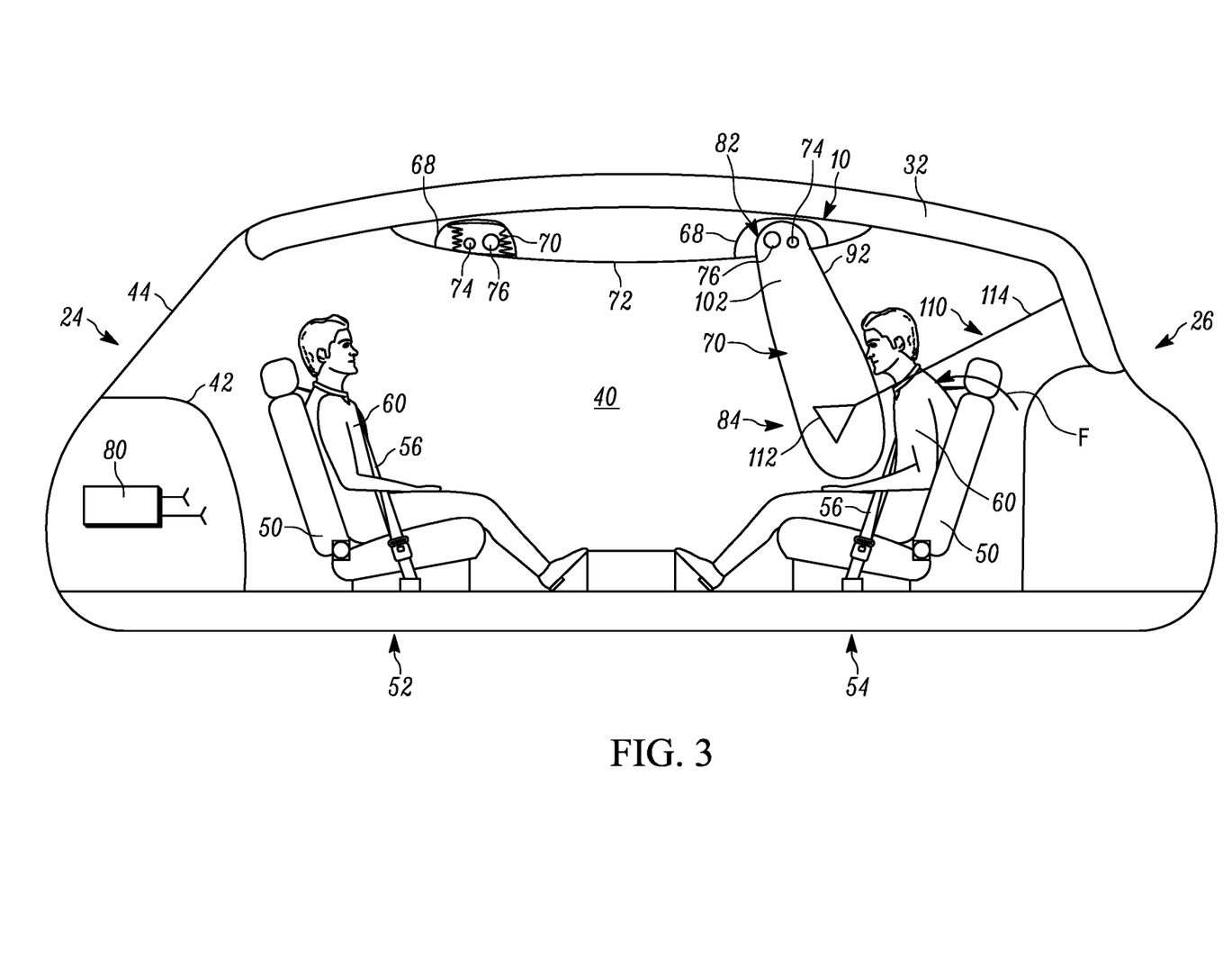
FIG. 3 is a schematic illustration of the cabin of the vehicle with the airbag in a deployed condition.

As shown in FIG. 3, upon sensing the occurrence of an event for which inflation of the airbag 70 is desired, such as a vehicle collision, the controller 80 provides signals to the inflators 74, 76. Upon receiving the signals from the controller 80, the inflators 74, 76 are actuated and provide inflation fluid to the inflatable volume of the airbag 70 in a known manner. The inflating airbag 70 exerts a force on the roof liner 72, which causes the roof liner to open. This releases the airbag 70 to inflate and deploy from its stored condition behind the roof liner 72 to a deployed condition extending into the cabin 40 forward of and aligned with a seat 50 in the rear row 54. The airbag 70, while inflated, helps protect the vehicle occupant 60 in the rear row 54 by absorbing the impact of the occupant.

Figure 4A:
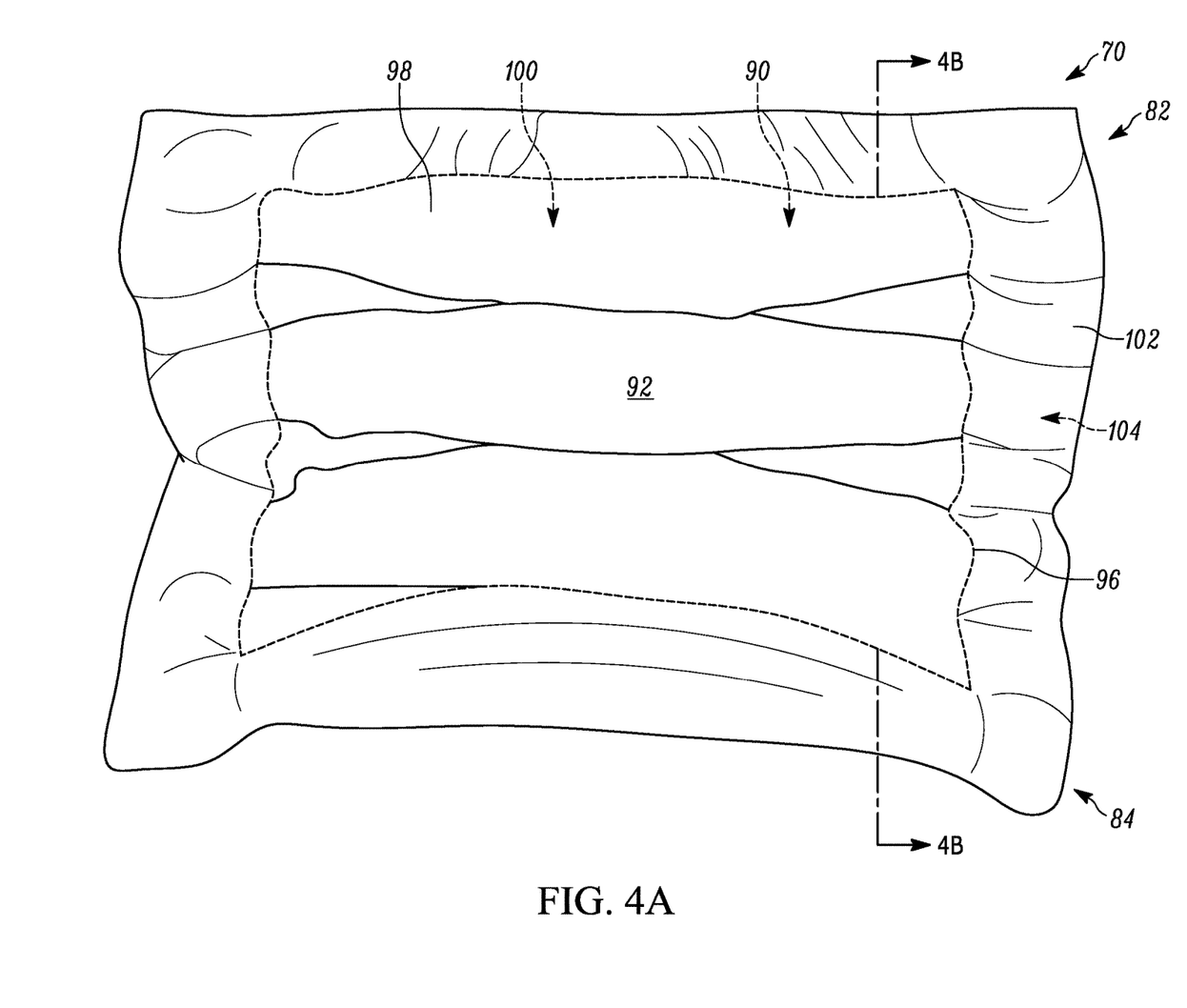
FIG. 4A is a front view of the airbag of FIG. 3.
Figure 4B:
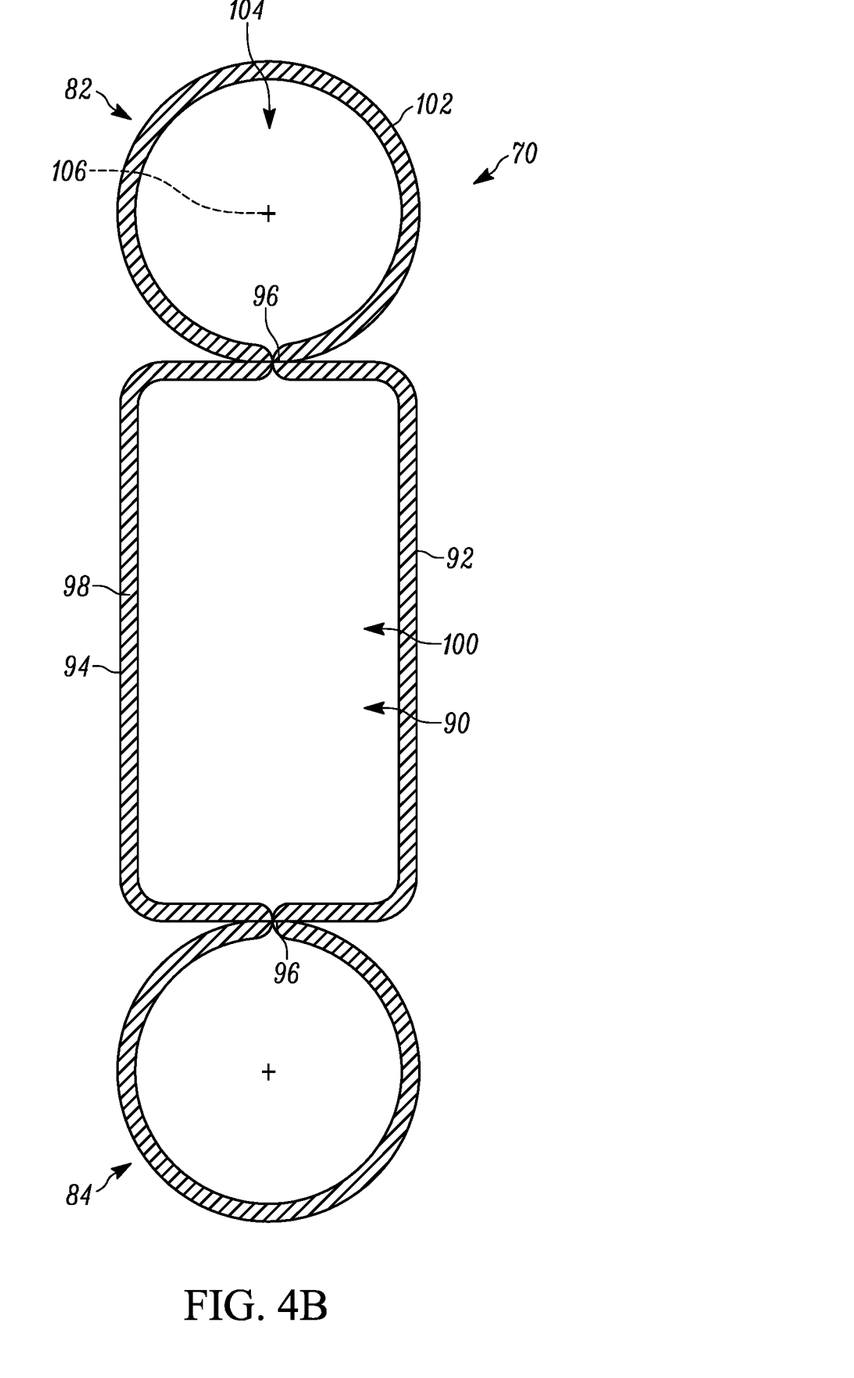
FIG. 4B is a section view taken along line 4B-4B of FIG. 4A.

The inflated airbag 70, when deployed, extends from an upper end 82 to a lower end 84. The upper end 82 is connected to the vehicle 20 and fluidly connected to the inflators 74, 76. The lower end 84 is positioned adjacent an occupant 60 in the seat 50 in the rear row 54. Referring to FIGS. 4A-4B, the airbag 70 includes an inflatable volume 90 defined by and between opposing panels 92, 94 of material. The panels 92, 94 can be separate pieces of material secured together or integrally formed with one another in a one-piece woven manner. The panel 92 faces towards the occupant 60 in the rear row 54 in a rearward direction of the vehicle 20. The panel 94 faces away from the occupant 60 in the rear row 54 in a forward direction of the vehicle 20.

A seam 96 extends through both panels 92, 94 to partition the airbag 70 into first and second portions 98, 102 defining respective first and second chambers 100, 104 of the inflatable volume 90. The seam 96 can have any construction suitable for fluidly isolating the first and second chambers 100, 104 from another. In one example, the seam 96 has a rectangular shape to define a polygonal (e.g., square or rectangular) first portion 98. The seam 96 can alternatively be round, circular, elliptical, etc. (not shown).

The second portion 102 extends around the perimeter of the first portion 98. Although the second portion 102 extends around the entire perimeter of the first portion 98 the second portion can alternatively extend around a portion of the first portion (not shown). The second portion 102 can have a circular or rectangular cross-section extending along a centerline 106 that is parallel to the seam 96.

The first chamber 100 is fluidly connected to the first inflator 74 and therefore receives inflation fluid at the first fluid pressure. The second chamber 104 is fluidly connected to the second inflator 76 and therefore receives inflation fluid at the greater second fluid pressure. Since the chambers 100, 104 are fluidly isolated from one another the second portion 102 is therefore stiffer and more resistant to deformation than the first portion 98.

As noted, there is no vehicle structure in position to act as a reaction surface to constrain movement of the deployed airbag 70. Consequently, the occupant restraint system 10 can include one or more tethers 110 (FIG. 3) associated with each airbag 70 and extending from each airbag to locations adjacent to or at the roof 32. Each tether 110 is formed from a single piece of inextensible material and extends from a first end 112 connected to the lower end 84 of the airbag 70 and a second end 114 connected to the roof 32. The first end 112 can be formed as a stress reducer for spreading the connection between the tether 110 and the airbag 70 over a larger surface area of the airbag fabric so as to prevent tearing.

As shown in FIG. 1, two tethers 110 are connected to the roof 32 on opposite sides of the airbag 70, namely, the inboard and outboard sides of each airbag. The tethers 110 associated with the airbags 70 adjacent each rear row 54 are connected to the roof 32 at locations rearward of the occupant-facing panel 92 of the airbag. Because the occupant 60 is belted, a frontal crash resulting in forward occupant movement causes the occupant to bend at the waist and follow an angled or arcuate path toward the airbag 70, as indicated generally by the arrow F in FIG. 3. Advantageously, as shown in FIG. 3, the location of the second end 114/roof 32 connection can be selected such that the tethers 110 extend in a direction or along a path that approximates or coincides with (i.e., lies substantially parallel to or coextensive with) the path along which the occupant 60 travels into contact with the airbag 70.

In this manner, the tension the tethers 110 apply to the airbag 70 can be opposite the impact forces applied to the airbag by the penetrating occupant 60. As a result, the roof 32, through the tethers 110, acts as the reaction surface for the airbag 70. The example configuration of FIG. 3 therefore requires no interaction with forward structure of the vehicle 20, such as an instrument panel, steering wheel, or seat, to provide a reaction surface for the airbag.

After the airbag 70 is deployed but prior to occupant 60 penetration, the deployed airbag fully tensions the tethers 110. The tethers 110 maintain the lower end 84 of the airbag 70 in the position shown to prevent swinging/pivoting of the airbag about the inflators 74, 76 when the airbag is penetrated by the occupant 60. The occupant 60 moves in the path F and ultimately impacts and penetrates the inflated and deployed airbag 70.

Figure 5:
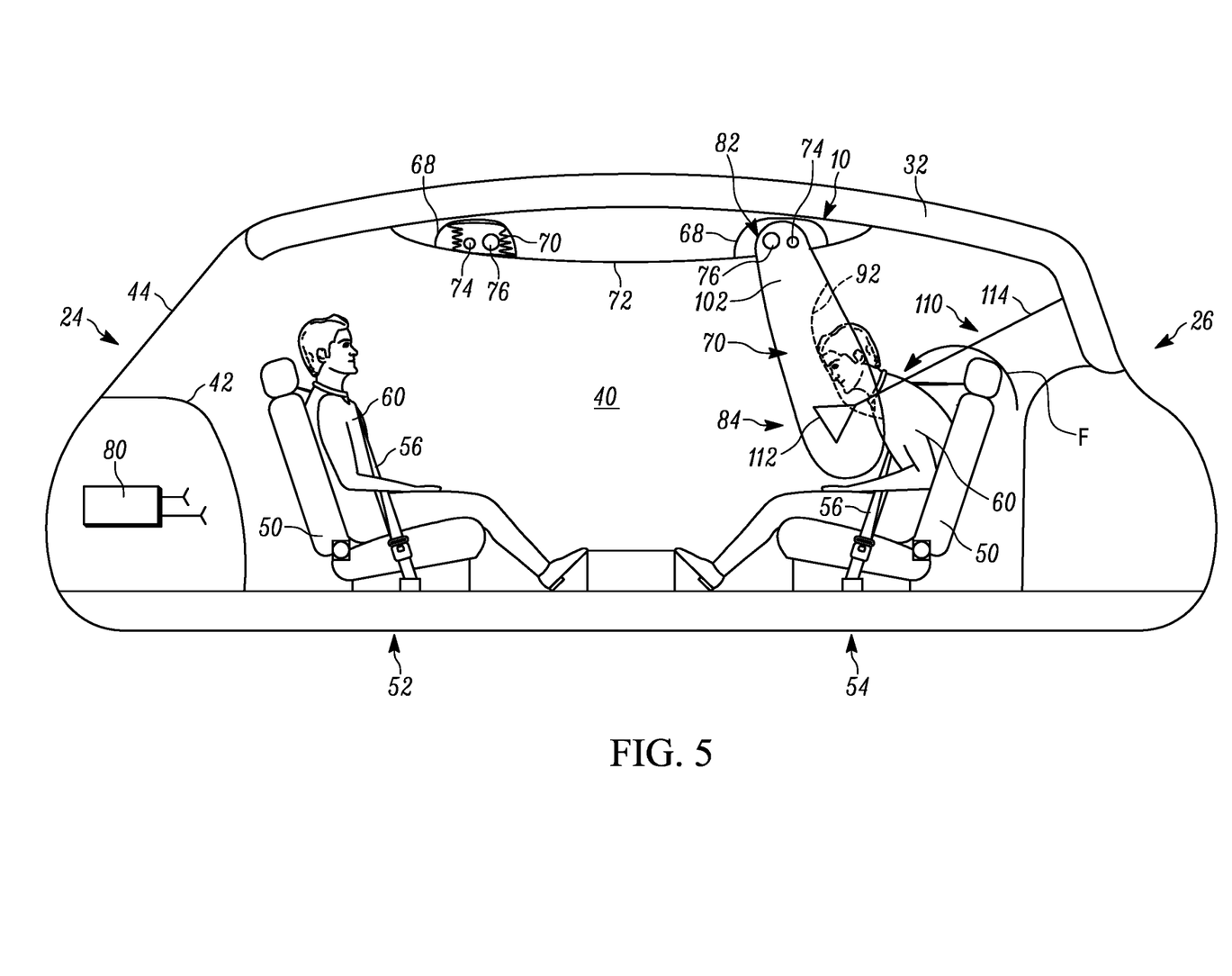
FIG. 5 is a schematic illustration of the occupant restraint system of FIG. 3 following occupant penetration into the airbag.

The higher inflation fluid pressure of the second portion 102, coupled with its connection to the taught tethers 110 and vehicle 20, helps ensure the second portion maintains its stiffness during occupant 60 penetration. The second portion 102 is therefore deformed a relatively negligible or nominal amount when the occupant 60 penetrates the airbag 70. On the other hand, the lower inflation fluid pressure of the first portion 98 (relative to the second portion 102) enables the panel 92 to move with the penetrating occupant 60 forward in the vehicle 20 in the general direction F. In other words, the difference in stiffness between the first and second portions 98, 102 allows the first portion to move with the penetrating occupant 60 while the second portion is substantially held in place by the vehicle 20 and tethers 110.

Due to this configuration, the occupant 60 is permitted to ride down the airbag 70 and experience a more gradual reaction with the airbag while the tethers 110 and roof 32 provide a reaction surface for the deployed, moving airbag. In other words, providing an airbag 70 with multiple chambers 100, 104 filled to different fluid pressures advantageously allows for a gradual slowdown of the penetrating occupant 60 into the airbag 70 in a prescribed manner. To this end, the inflators 74, 76 can be configured to provide first and second inflation fluid pressures that allow for a predetermined amount of panel 92 movement and ride-down in response to occupant 60 penetration into the airbag 70.

Figure 6:
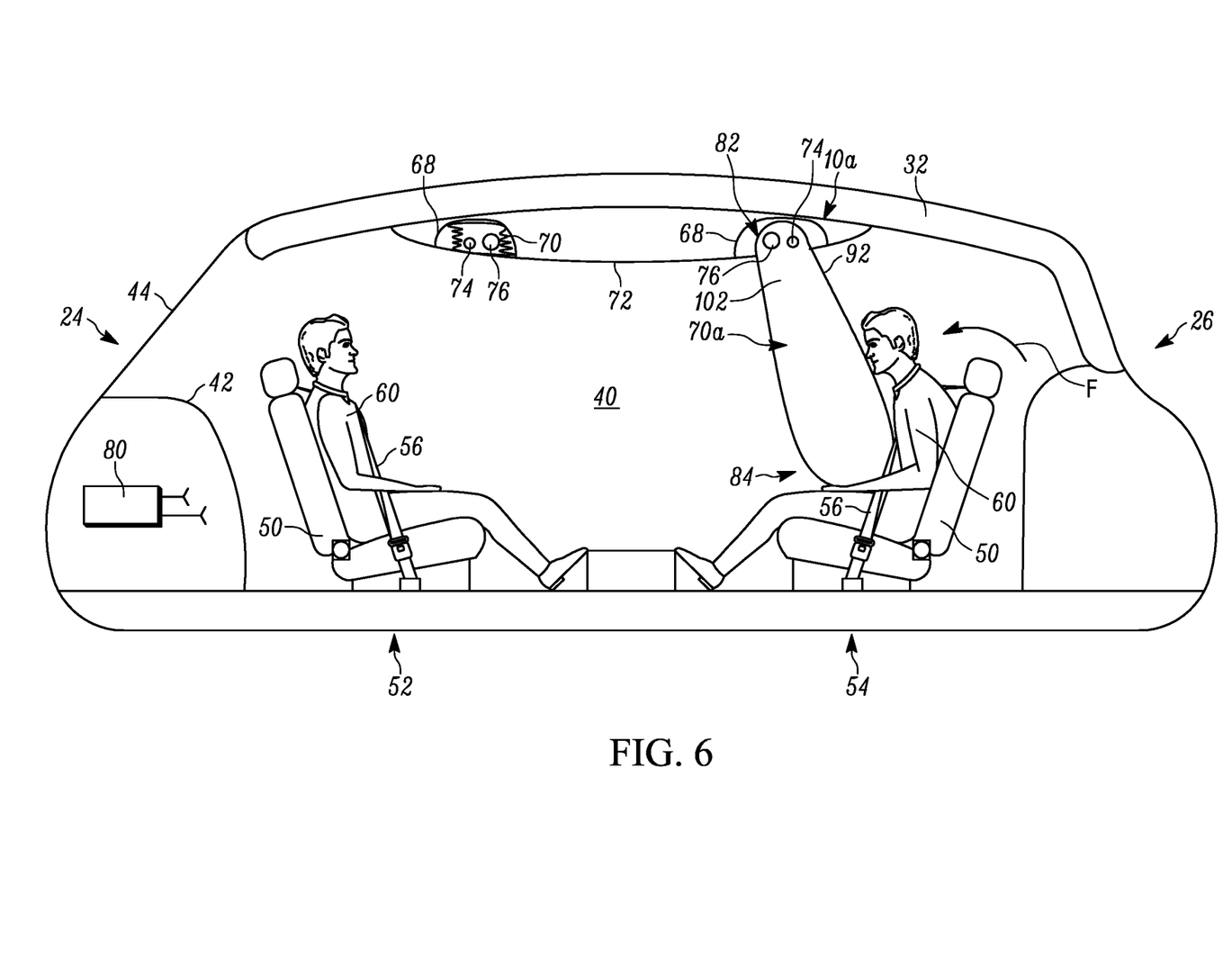
FIG. 6 is a schematic illustration of the cabin of the vehicle with another example occupant restraint system with an airbag in a deployed condition.
Figure 7:
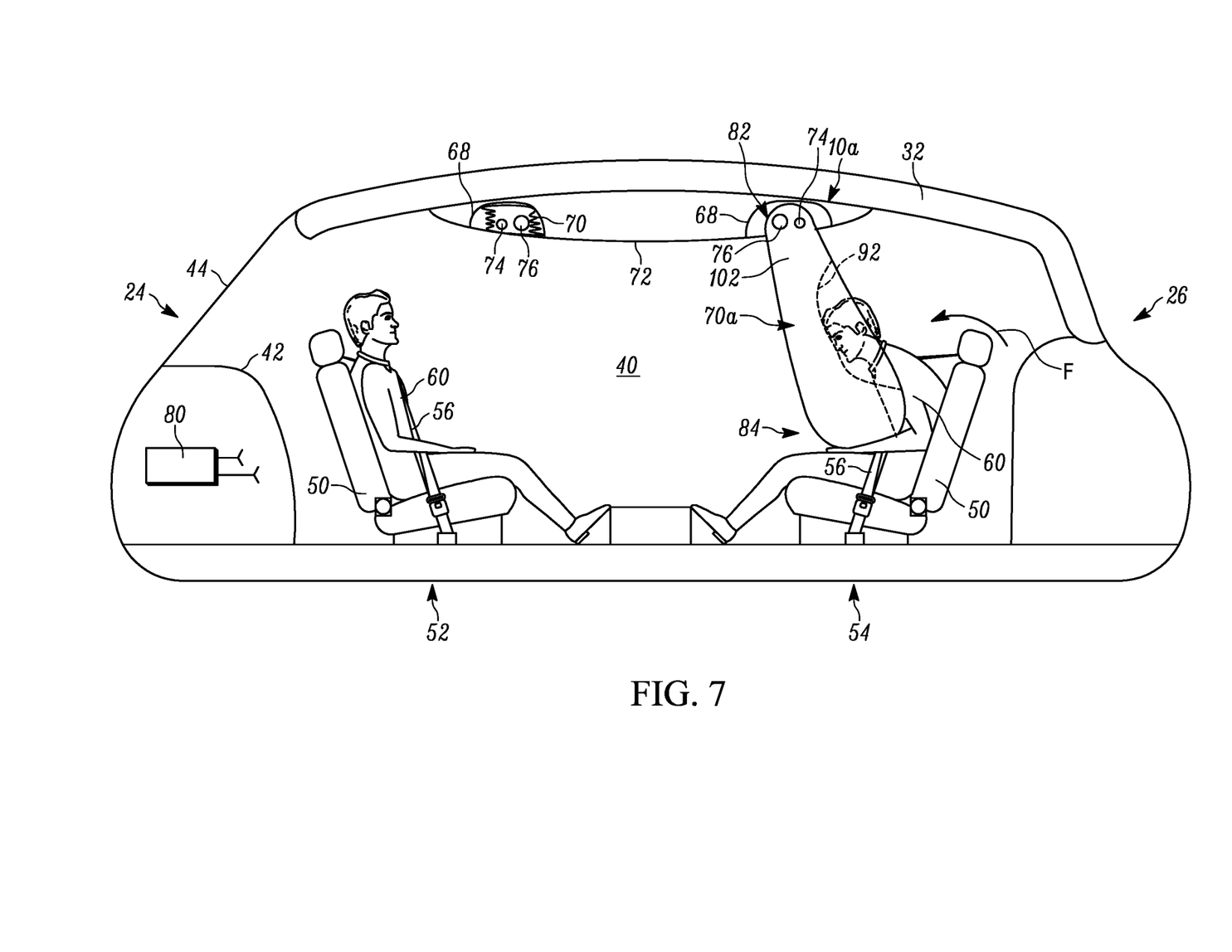
FIG. 7 is a schematic illustration of the occupant restraint system of FIG. 6 following occupant penetration into the airbag.

In another example occupant restraint system 10*a* shown in FIGS. 6-7, the tethers 110 are omitted. Referring to FIG. 6, the airbag 70*a* is configured to deploy downward sufficient to engage the occupant 60 (e.g., engage the occupant's lap and/or lower torso). The degree of occupant 60 engagement and the second inflation fluid pressure supplied by the second inflator 76 are selected to help ensure the lower end 84 of the airbag 70*a* remains in position when the occupant 60 penetrates the first portion 98.

In other words, the lower end 84 is held in position by engaging the occupant's 60 lap to prevent swinging/pivoting of the airbag 70*a* in response to the occupant moving in the direction F to penetrate the first portion 98 (see FIG. 7). Consequently, the lower end 84 of the airbag 70*a* in the occupant restraint system 10 functions similarly to the tether 110 in the occupant restraint system 10*a*. In this manner, the occupant's 60 lap acts as the reaction surface for the airbag 70*a*. The example configuration of FIG. 6 therefore requires no interaction with forward structure of the vehicle 20, such as an instrument panel, steering wheel, or seat, to provide a reaction surface for the airbag.

The occupant 60 then interacts with the deployed airbag 70*a* in the same manner as discussed above. In particular, the occupant 60 moves in the path F and ultimately impacts and penetrates the inflated and deployed airbag 70*a*. The difference in stiffness between the first and second portions 98, 102 allows the first portion to move with the penetrating occupant 60 while the second portion is substantially held in place by the vehicle 20 and occupant's 60 lap. Due to this configuration, the occupant 60 is permitted to ride down the airbag 70*a* and experience a more gradual reaction with the airbag while the occupant's lap provides a reaction surface for the deployed, moving airbag.

Although the descriptions of the airbags 70 and, when present, the tethers 110 above are directed to the rear row 54 of seats 50, it will be appreciated that the same airbags and tethers can be provided for the front row 52 of the seats (see FIGS. 1-2). Since the seats 50 in the rows 52, 54 face in opposite directions, the purposes of their respective airbags 70 differ from each other. In the event of a frontal vehicle crash, the rearward-facing seats 50 in the front row 52 will help protect their occupants 60 by absorbing the impact of the occupants. The airbags 70 of the forward-facing rear seats 50 in the rear row 54 will help protect their occupants 60 by absorbing the impact energy of the occupants. In the event of a rear vehicle crash, the seatbacks of the forward-facing seats 50 in the rear row 54 will help protect their occupants 60 by absorbing the impact with the occupants. The airbags 70 of the rearward-facing seats 50 in the front row 52 will help protect their occupants 60 by absorbing the impact energy of the occupants.

What have been described above are examples of the present invention. It is, of course, not possible to describe every conceivable combination of components or methodologies for purposes of describing the present invention, but one of ordinary skill in the art will recognize that many further combinations and permutations of the present invention are possible. Accordingly, the present invention is intended to embrace all such alterations, modifications and variations that fall within the spirit and scope of the appended claims.

What is claimed is:

1. A restraint system for helping to protect an occupant of a vehicle having a roof and a cabin with a seat for the occupant, comprising:
a first inflator for providing inflation fluid at a first fluid pressure;
a second inflator for providing inflation fluid at a second fluid pressure greater than the first fluid pressure;
an airbag having a stored condition within the roof and being inflatable to a deployed condition extending into the cabin and aligned with the seat, the airbag including a first portion defining a first chamber fluidly connected to the first inflator and a second portion defining a second chamber fluidly connected to the second inflator and fluidly isolated from the first chamber, the first portion moving relative to the second portion in response to occupant penetration into the first portion.

2. The restraint system of claim 1, wherein the first portion of the airbag is rectangular and the second portion extends around the perimeter of the first portion.

3. The restraint system of claim 1, wherein the second portion extends around the entire perimeter of the first portion.

4. The restraint system of claim 1, wherein the second portion has a circular cross-section about a centerline extending parallel to the perimeter of the first portion.

5. The restraint system of claim 1 further comprising at least one tether having a first end secured to the second portion and a second end connected to the roof for limiting movement of the second portion of the airbag in response to occupant penetration into the first portion.

6. The restraint system of claim 5, wherein the airbag extends from a first end connected to the vehicle to a second end positioned adjacent the seat, the first end of the tether being connected to the second end of the airbag.

7. The restraint system of claim 1, wherein the second portion is configured to deploy into engagement with the occupant for limiting movement of the second portion of the airbag in response to occupant penetration into the first portion.

8. The restraint system of claim 1, wherein the first portion moves in a forward direction of the vehicle relative to the second portion in response to occupant penetration into the first portion.

9. The restraint system of claim 1, wherein the first portion moves in a rearward direction of the vehicle relative to the second portion in response to occupant penetration into the first portion.

10. The restraint system of claim 1, wherein the airbag includes first and second panels interconnected by a seam to define the first and second portions.

11. The restraint system of claim 1, wherein only inflation fluid from the first inflator enters the first chamber and only inflation fluid from the second inflator enters the second chamber.

12. A restraint system for helping to protect an occupant of a vehicle having a roof and a cabin with a seat for the occupant, comprising:
a first inflator for providing inflation fluid at a first fluid pressure;

a second inflator for providing inflation fluid at a second fluid pressure greater than the first fluid pressure;

an airbag having a stored condition within the roof and being inflatable to a deployed condition extending into the cabin and aligned with the seat, the airbag including panels interconnected by a seam to form a first portion defining a first chamber and a second portion defining a second chamber fluidly isolated from the first chamber, the second portion extending around the entire perimeter of the first portion, the first and second chambers being fluidly connected to the respective first and second inflators, the first portion moving relative to the second portion in response to occupant penetration into the first portion.

13. The restraint system of claim 12, wherein the first portion of the airbag is rectangular.

14. The restraint system of claim 12, wherein the second portion has a circular cross-section about a centerline extending parallel to the perimeter of the first portion.

15. The restraint system of claim 12 further comprising tethers each having a first end secured to the second portion and a second end connected to the roof for limiting movement of the second portion of the airbag in response to occupant penetration into the first portion.

16. The restraint system of claim 15, wherein the airbag extends from a first end connected to the vehicle to a second end positioned adjacent the seat, the first end of each tether being connected to the second end of the airbag.

17. The restraint system of claim 12, wherein the second portion is configured to deploy into engagement with the occupant for limiting movement of the second portion of the airbag in response to occupant penetration into the first portion.

18. The restraint system of claim 12, wherein the first portion moves in a forward direction of the vehicle relative to the second portion in response to occupant penetration into the first portion.

19. The restraint system of claim 12, wherein the first portion moves in a rearward direction of the vehicle relative to the second portion in response to occupant penetration into the first portion.

20. The restraint system of claim 12, wherein only inflation fluid from the first inflator enters the first chamber and only inflation fluid from the second inflator enters the second chamber.

* * * * *